(12) United States Patent
Luo et al.

(10) Patent No.: US 11,631,169 B2
(45) Date of Patent: Apr. 18, 2023

(54) INSPECTION OF NOISY PATTERNED FEATURES

(71) Applicant: KLA Corporation, Milpitas, CA (US)

(72) Inventors: Tao Luo, Fremont, CA (US); Yong Zhang, Cupertino, CA (US)

(73) Assignee: KLA Corp., Milpitas, CA (US)

( * ) Notice: Subject to any disclaimer, the term of this patent is extended or adjusted under 35 U.S.C. 154(b) by 360 days.

(21) Appl. No.: 16/945,922

(22) Filed: Aug. 2, 2020

(65) Prior Publication Data

US 2022/0036528 A1 Feb. 3, 2022

(51) Int. Cl.
*G06K 9/00* (2022.01)
*G06T 7/00* (2017.01)

(52) U.S. Cl.
CPC ............ *G06T 7/001* (2013.01); *G06T 7/0006* (2013.01); *G06T 2207/10061* (2013.01); *G06T 2207/20081* (2013.01); *G06T 2207/30136* (2013.01); *G06T 2207/30148* (2013.01)

(58) Field of Classification Search
CPC ............... G06T 7/001; G06T 7/0006; G06T 2207/10061; G06T 2207/20081; G06T 2207/30136; G06T 2207/30148; G06T 2207/20084
See application file for complete search history.

(56) References Cited

U.S. PATENT DOCUMENTS

| | | | |
|---|---|---|---|
| 7,558,419 B1 | 7/2009 | Ye et al. | |
| 7,570,796 B2 | 8/2009 | Zafar et al. | |
| 7,676,077 B2 | 3/2010 | Kulkarni et al. | |
| 7,782,452 B2 | 8/2010 | Mehanian et al. | |
| 8,126,255 B2 | 2/2012 | Bhaskar et al. | |
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |

(Continued)

FOREIGN PATENT DOCUMENTS

KR 10-2019-0069533 6/2019

OTHER PUBLICATIONS

U.S. Appl. No. 16/901,102 by Zhang et al. filed Jun. 15, 2020 (submitted as U.S. Patent Application Publication No. 2021/0174483 published Jun. 10, 2021).

(Continued)

*Primary Examiner* — Samir A Ahmed
(74) *Attorney, Agent, or Firm* — Ann Marie Mewherter

(57) ABSTRACT

Methods and systems for detecting defects on a specimen are provided. One system includes an inspection subsystem configured to generate images of a specimen and one or more computer subsystems configured for detecting defect candidates on the specimen. Detecting the defect candidates includes identifying a patterned feature in a test image included in the images generated of the specimen. Detecting the defect candidates also includes, for at least one pixel in the test image located within the patterned feature, determining a difference between a characteristic of the at least one pixel and the characteristic of other pixels in the test image located within a predetermined window of the at least one pixel. In addition, detecting the defect candidates includes detecting a defect candidate at the at least one pixel based on the determined difference.

29 Claims, 12 Drawing Sheets

(56) References Cited

U.S. PATENT DOCUMENTS

| | | |
|---|---|---|
| 9,222,895 B2 | 12/2015 | Duffy et al. |
| 10,607,119 B2 | 3/2020 | He et al. |
| 2001/0053242 A1 | 12/2001 | Okada |
| 2009/0037134 A1* | 2/2009 | Kulkarni ............ G01N 21/9501 |
| | | 702/127 |
| 2010/0150426 A1 | 6/2010 | Onishi et al. |
| 2017/0284944 A1* | 10/2017 | Jiang ........................ G06T 5/40 |
| 2017/0352140 A1 | 12/2017 | Isomura |
| 2019/0066284 A1* | 2/2019 | Jiang ........................ G06T 7/001 |
| 2019/0073568 A1* | 3/2019 | He ........................ G06V 10/40 |
| 2019/0122913 A1* | 4/2019 | Lauber .................... G06T 7/001 |
| 2020/0173932 A1 | 6/2020 | Zhang et al. |
| 2021/0125325 A1 | 4/2021 | Huang et al. |
| 2021/0174483 A1 | 6/2021 | Zhang et al. |

OTHER PUBLICATIONS

U.S. Appl. No. 16/663,283 by Huang et al. filed Oct. 24, 2019 (submitted as U.S. Patent Application Publication No. 2021/0125325 published Apr. 29, 2021).

International Search Report and Written Opinion for PCT/US2021/042668 dated Nov. 4, 2021.

\* cited by examiner

INSPECTION OF NOISY PATTERNED FEATURES

BACKGROUND OF THE INVENTION

1. Field of the Invention

The present invention generally relates to methods and systems configured for detecting defects on specimens such as redistribution layers (RDL) on backend packaging wafers.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Since the beginning of the integrated circuit (IC) industry, wafer inspection has been largely based on the image intensity difference between adjacent dies, because lithography generally involves printing "near identical" adjacent dies. As the technology evolved, another technique called "golden reference die" or "standard reference die" was created for inspecting dies with common die defects induced from mask defects.

Whether die-to-die or die-to-golden die inspection is performed, the common hypothesis is that each die on the wafer is near "identical." These traditional inspection methods have been very effective in lithography-based wafer manufacturing processes.

In recent IC manufacturing processes, a new packaging process is applied in which a final die unit is composed by connecting two or more diced and tested good sub-dies through redistribution layer (RDL) lines, as shown in FIG. 2. In particular, final die unit 200 is composed of sub-dies 202 and 204 connected by a plurality of RDL lines 206. In this manner, a new backend advanced wafer level packaging (aWLP) process makes a new die from sub-dies.

Since the sub-dies are mechanically placed on a mold and RDL lines are placed on top of the sub-dies, there can be inconsistent sub-die shifts between adjacent die units. With this kind of inconsistency, the traditional die-to-die difference calculations will contribute a substantial amount of noise to inspection results even if the RDL lines in adjacent die units are perfectly aligned. For example, as shown in FIG. 3, adjacent composed die units may have inconsistent shifts underneath the RDL lines. In particular, FIG. 3 shows two final die units 300 and 302. Final die unit 300 is formed of sub-dies 304 and 306 connected by RDL lines 308, and final die unit 302 is formed of sub-dies 310 and 312 connected by RDL lines 314. As shown more clearly in exploded view 316 of final die unit 300 and exploded view 318 of final die unit 302, different final die units can have inconsistent shifts between sub-dies underneath the RDL lines.

Furthermore, the RDL lines are mainly made of metal (aluminum or copper). The defects of interest (DOIs) in RDL lines are line opening defects (disconnected line) and partial line opening defects (also called "mouse-bite" defects), as shown in FIGS. 4 and 5. In particular, FIG. 4 shows test image 400, reference image 402, and difference image 404 for a complete line opening defect in an RDL line. As can be clearly seen in circled portion 406 of test image 400, the line opening defect is obvious in the test image. However, as shown in difference image 404 (generated by subtracting reference image 402 from test image 400), the line opening defect cannot be detected in circled portion 408, which corresponds to circled portion 406 of test image 400, and the portion of the difference image corresponding to the line opening defect cannot be differentiated from other portions of the difference image such as that shown in square portion 410. Therefore, difference image 404 cannot be used to successfully detect the line opening defect.

FIG. 5 shows reference image 500, test image 502, and difference image 504 for another line opening defect on an RDL line. As can be seen from test image 502, a partial line opening defect located in circled portion 510 of the test image is obvious in the test image. However, as shown in difference image 504 (generated by subtracting reference image 500 from test image 502), the partial line opening defect cannot be detected in circled portion 514, which corresponds to circled portion 510 in the test image. In addition, the portion of the difference image corresponding to the partial line opening defect cannot be differentiated from other portions of the difference image such as that shown in square portion 512, which corresponds to non-defective portions 506 of the reference image and 508 of the test image. As such, difference image 504 cannot be used to detect the partial line opening defect visible in test image 502.

In both FIGS. 4 and 5, therefore, it is clear that the test images contain obvious line opening or partial line opening defects. The surface roughness of the metal RDL lines, however, makes intensity-difference based inspection extremely difficult even though the real defect signal exists in the test images, because the line opening or partial line opening signals in the difference images are completely buried in the noise generated by the random roughness in the corresponding lines in test and reference images.

Accordingly, it would be advantageous to develop systems and methods for detecting defects such as complete and/or partial line opening defects in RDL lines on specimens such as backend aWLP specimens that do not have one or more of the disadvantages described above.

SUMMARY OF THE INVENTION

The following description of various embodiments is not to be construed in any way as limiting the subject matter of the appended claims.

One embodiment relates to a system configured to detect defects on a specimen. The system includes an inspection subsystem configured to generate images of a specimen. The system also includes one or more computer subsystems configured for detecting defect candidates on the specimen. Detecting the defect candidates includes identifying a patterned feature in a test image included in the images generated of the specimen. Detecting the defect candidates also includes, for at least one pixel in the test image located within the patterned feature, determining a difference between a characteristic of the at least one pixel and the characteristic of other pixels in the test image located within a predetermined window of the at least one pixel. In addition, detecting the defect candidates includes detecting a defect candidate at the at least one pixel based on the determined difference. The system may be further configured as described herein.

Another embodiment relates to a computer-implemented method for detecting defects on a specimen. The method includes identifying a patterned feature in a test image included in images generated of a specimen by an inspection subsystem. The method also includes, for at least one pixel in the test image located within the patterned feature, determining a difference between a characteristic of the at least one pixel and the characteristic of other pixels in the test image located within a predetermined window of the at least one pixel. In addition, the method includes detecting a defect candidate at the at least one pixel based on the determined difference. The identifying, determining, and detecting are performed by one or more computer subsystems coupled to the inspection subsystem.

Each of the steps of the method described above may be further performed as described herein. In addition, the embodiment of the method described above may include any other step(s) of any other method(s) described herein. Furthermore, the method described above may be performed by any of the systems described herein.

Another embodiment relates to a non-transitory computer-readable medium storing program instructions executable on one or more computer systems for performing a computer-implemented method for detecting defects on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
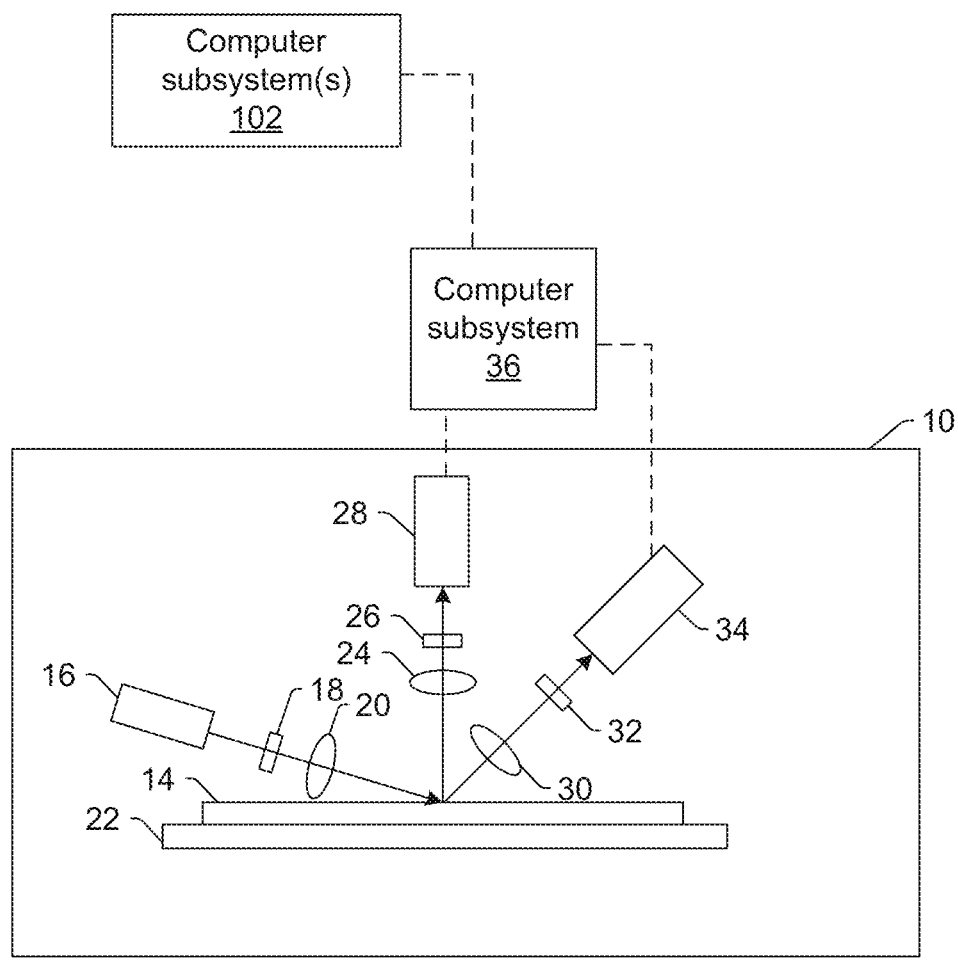
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

The terms "design" and "design data" as used herein generally refer to the physical design (layout) of an IC and data derived from the physical design through complex simulation or simple geometric and Boolean operations. The physical design may be stored in a data structure such as a graphical data stream (GDS) file, any other standard machine-readable file, any other suitable file known in the art, and a design database. A GDSII file is one of a class of files used for the representation of design layout data. Other examples of such files include GL1 and OASIS files and proprietary file formats such as RDF data, which is proprietary to KLA Corp., Milpitas, Calif. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

The "design" and "design data" described herein also refers to information and data that is generated by semiconductor device designers in a design process and is therefore available for use in the embodiments described herein well in advance of printing of the design on any physical wafers. The "design" or "physical design" may also be the design as it would be ideally formed on the wafer.

"Nuisances" as that term is used herein are defects that a user does not care about and/or events that are detected by inspection but are not actually defects. Nuisances that are detected as events (or "defect candidates") but are not actually defects may be detected due to non-defect noise sources on a specimen (e.g., line edge roughness (LER), relatively small critical dimension (CD) variation in patterned features, thickness variations, metal grain noise, etc.) and/or due to marginalities in the inspection subsystem itself or its configuration used for inspection. Generally, therefore, the goal of inspection is not to detect nuisances on specimens such as wafers.

The term "defects of interest (DOIs)" as used herein is defined as defects that are detected on a specimen and are really actual defects on the specimen. Therefore, the DOIs are of interest to a user because users generally care about how many and what kind of actual defects are on specimens being inspected. In some contexts, the term "DOI" is used to refer to a subset of all of the actual defects on the specimen, which includes only the actual defects that a user cares about. For example, there may be multiple types of DOIs on any given specimen, and one or more of them may be of greater interest to a user than one or more other types. In the context of the embodiments described herein, however, the term "DOIs" is used to refer to any and all real defects on a specimen.

One embodiment relates to a system configured to detect defects on a specimen. In one embodiment, the specimen is a wafer. The wafer may include any wafer known in the semiconductor arts. Although some embodiments may be described herein with respect to a wafer or wafers, the embodiments are not limited in the specimen for which they can be used. For example, the embodiments described herein may be used for specimens such as reticles, flat panels, personal computer (PC) boards, and other semiconductor specimens.

In one embodiment, the specimen includes a metal upper layer. In one such embodiment, the upper layer may be an aluminum layer. The aluminum layer may include any suitable aluminum layer known in the art. The upper layer of the specimen may also include a back end of line (BEOL) layer, which may include any BEOL layer known in the art including those described herein. In a further embodiment, the upper layer of the specimen may be a re-distribution layer (RDL), which may have any suitable configuration known in the art.

The upper layer of the specimen may also include metal lines. For example, BEOL and RDL layers may include metal lines that form various elements of the devices being formed on the specimen. Such metal lines may produce a significant amount of "grain" noise, which is described further herein. "Grain" as that term is used herein refers to dislocations in the crystalline structure of a metal (such as aluminum or copper). The embodiments described herein are configured for enabling detection of defects on such layers despite the grain noise.

In some embodiments, the specimen is a post-dice specimen. A "post-dice" specimen can be generally defined as a wafer or other substrate on which multiple devices have been formed (e.g., in different dies or dice) and then separated from each other in one of various ways. A "post-dice" specimen may also be a specimen that has been separated into multiple dies or dice, which have not yet entered the packaging process.

In another embodiment, the specimen includes a high noise layer. A "high noise" layer as that term is defined herein generally refers to a layer whose noise is the predominant obstacle in inspection of the layer. For example, while every wafer layer that is inspected by any inspection tool may exhibit more or less noise than other layers (and techniques for handling detection of such noise must in general be used in the inspection of every wafer layer), the primary obstacle in inspecting wafer layers successfully is most often the extremely small size of the defects that must be detected. In contrast, the embodiments described herein are particularly suitable for detecting relatively large ("macro") defects of about 200 nm and above in size. Therefore, the primary obstacle in such inspection is not necessarily the size of the defects that must be detected (as many inspection tool configurations are capable of detecting such large defects on most layers). Instead, the layers described herein will in general exhibit such "high noise" levels in images generated for the layers that detecting defects of even such large sizes can be rendered difficult if not impossible. However, the embodiments described herein have been designed to handle such noise levels via the defect detection described herein.

The embodiments described herein were designed to be particularly effective for detecting such defects for a number of different reasons. For example, in traditional front-end lithographic wafer fabrication processes, the wafer inspection is usually performed by image comparison between adjacent dies because of the valid hypothesis of identical images from adjacent dies. With reasonable steps of preprocessing, e.g., adjacent die image alignment and gray level uniformity scaling through histogram remapping, greater than threshold differences are usually caused by abnormalities and thus potential defects.

Figure 2:
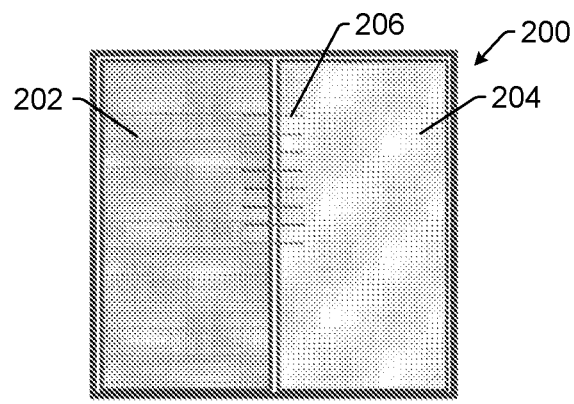
FIG. 2 is a schematic diagram illustrating a plan view of one example of a die created from multiple sub-dies on top of which redistribution layer (RDL) lines are formed.
Figure 3:
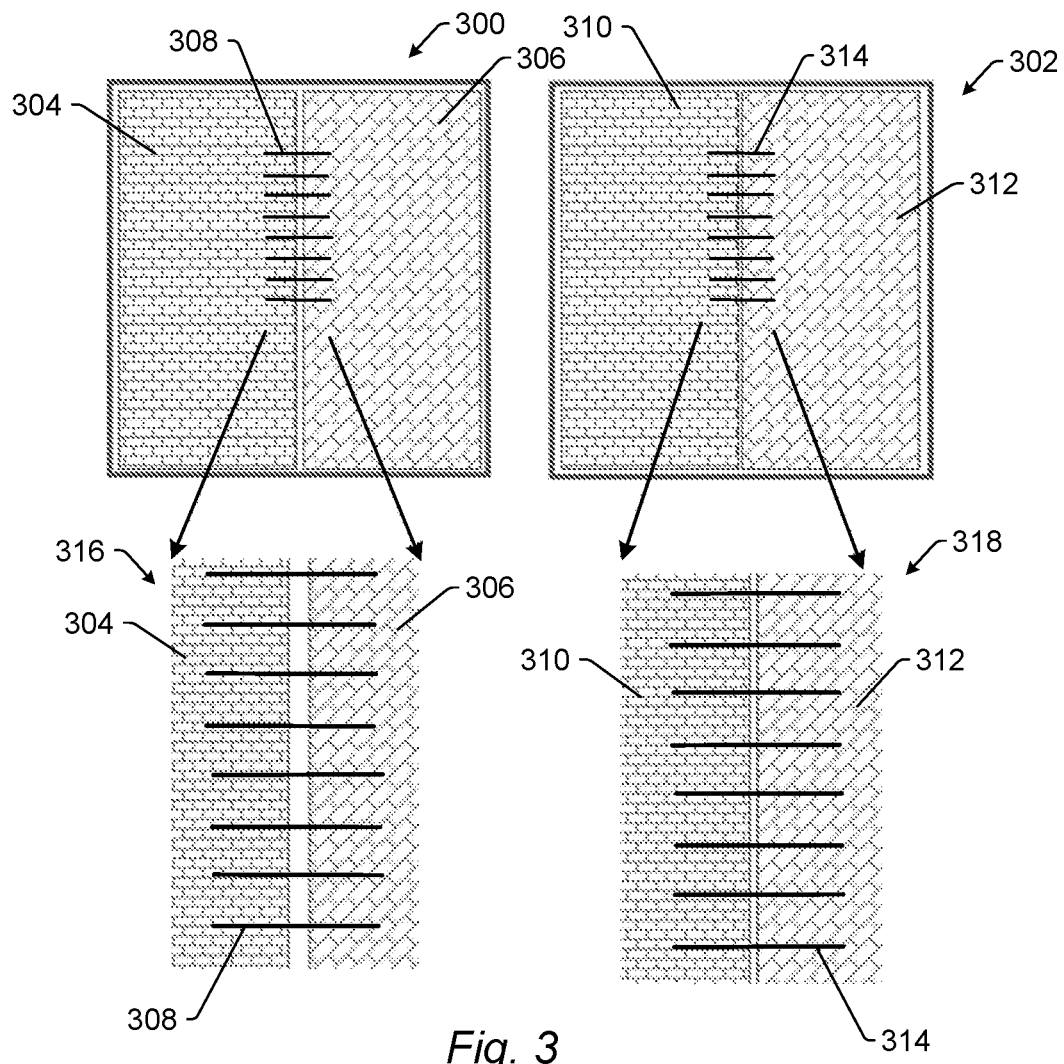
FIG. 3 is a schematic diagram illustrating a plan view of examples of dies constructed from multiple sub-dies having inconsistent shifts relative to each other underneath RDL lines formed thereon.
Figure 4:
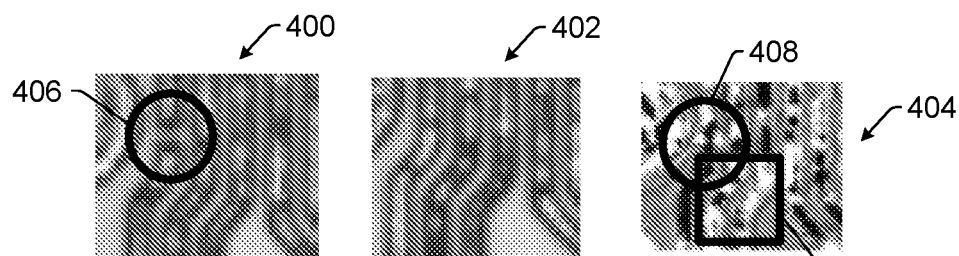
FIGS. 4 and 5 include examples of test, reference, and difference images for different line opening defects in RDL lines.
Figure 5:
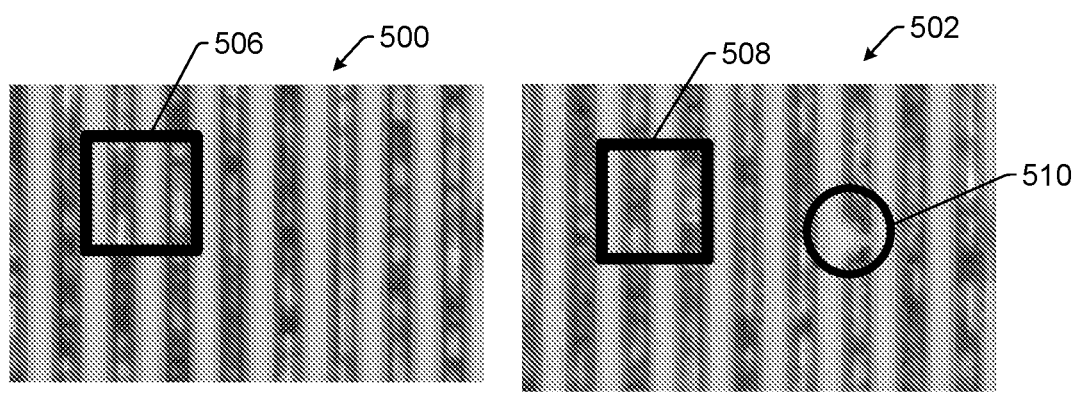
Figure 5:
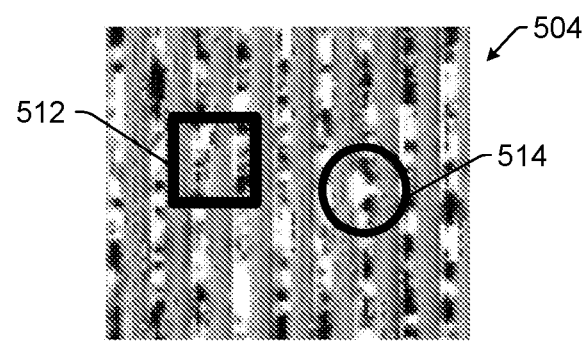

In new advanced wafer level package (aWLP) technology, a composed die unit can be made by connecting sub-dies (already tested to be good) via RDL lines. An example of such a composed die unit is shown in FIG. 2 described further above. The RDL lines and the sub-dies underneath the RDL lines may have inconsistent relative spatial shifts, as shown in FIG. 3 discussed further above. Even with alignment between adjacent dies performed with respect to the RDL lines, the sub-die structures underneath the RDL lines can be misaligned. Such misalignment makes the traditional die-to-die difference-based approach substantially difficult due to the misalignment noise from the structures underneath the RDL lines.

In addition, since the RDL lines are usually metal (copper), the surface roughness induced random optical appearance of RDL line images can make the intensity-difference-based detection of RDL line opening defects even more challenging, since line opening defect signals can be completely buried in the surface roughness induced noise. In one such example, substantial noise can be detected by inspection due to within RDL metal line noise, which may be caused by excessive metal grain. In another such example, substantial noise can be detected by inspection due to inter-RDL metal layer noise caused by transparent dielectric polymer on or under the RDL layer.

The embodiments described herein however provide RDL line inspection that is not hampered by severe die-to-die difference noise. In addition, the embodiments described herein may perform a test image-only (i.e., not die-to-die) inspection for RDL lines. In this manner, the embodiments described herein may be single die inspection (SDI) or single image detection (SID) systems and methods for detecting such defects, which will eliminate the die-to-die source of noise in inspection.

One embodiment of a system configured to detect defects on a specimen is shown in FIG. 1. The system includes inspection subsystem 10 and one or more computer subsystems (e.g., computer subsystem 36 and computer subsystem(s) 102). Inspection subsystem 10 is configured to generate output (e.g., images) for a specimen. In one embodiment, the inspection subsystem is configured as an optical subsystem. For example, in the embodiment of FIG. 1, the inspection subsystem is configured for scanning light over or directing light to a physical version of the specimen while detecting light from the specimen to thereby generate the output for the specimen. The inspection subsystem may also be configured to perform the scanning (or directing) and the detecting with multiple modes.

In one embodiment, the inspection subsystem is configured for macro inspection. The system described herein may, therefore, be referred to as a macro inspection tool. A macro inspection tool is particularly suitable for inspection of relatively noisy BEOL layers such as RDL and post-dice applications to detect defects in the presence of enormous noise such as grain on metal lines. A macro inspection tool is defined herein as a system that is not necessarily diffraction limited and has a spatial resolution of about 200 nm to about 2.0 microns and above. Such spatial resolution means that the smallest defects that such systems can detect have dimensions of greater than about 200 nm, which is much larger than the smallest defects that the most advanced inspection tools on the market today can detect, hence the "macro" inspector designation. Such systems tend to utilize longer wavelengths of light (e.g., about 500 nm to about 700 nm) compared to the most advanced inspection tools on the market today. These systems may be used when the DOIs have relatively large sizes and possibly also when throughputs of 100 wafers per hour (wph) or more are required (wafer throughput here refers to number of 300 mm wafers inspected per hour).

In the embodiment of the system shown in FIG. 1, inspection subsystem 10 includes an illumination subsystem configured to direct light to specimen 14. The illumination subsystem includes at least one light source. For example, as shown in FIG. 1, the illumination subsystem includes light source 16. The illumination subsystem may be configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen.

The inspection subsystem may be configured to direct the light to the specimen at different angles of incidence at different times. For example, the inspection subsystem may be configured to alter one or more characteristics of one or more elements of the illumination subsystem such that the light can be directed to the specimen at an angle of incidence that is different than that shown in FIG. 1. In one such example, the inspection subsystem may be configured to move light source 16, optical element 18, and lens 20 such that the light is directed to the specimen at a different oblique angle of incidence or a normal (or near normal) angle of incidence.

The inspection subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the inspection subsystem may be configured to alter one or more of the elements of the illumination subsystem based on the type of illumination to be used for inspection.

The inspection subsystem may also include a scanning subsystem configured to cause the light to be scanned over the specimen. For example, the inspection subsystem may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the inspection subsystem may be configured such that one or more optical elements of the inspection subsystem perform some scanning of the light over the specimen. The light may be scanned over the specimen in any suitable fashion such as in a serpentine-like path or in a spiral path.

The inspection subsystem further includes one or more detection channels. At least one of the one or more detection channels includes a detector configured to detect light from the specimen due to illumination of the specimen and to generate output responsive to the detected light. For example, the inspection subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., specularly reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the inspection subsystem that includes two detection channels, the inspection subsystem may include a different number of detection channels (e.g., only one detection channel or two or more detection channels). In one such instance, the detection channel formed by collector 30, element 32, and detector 34 may form one side channel as described above, and the inspection subsystem may include an additional detection channel (not shown) formed as another side channel that is positioned on the opposite side of the plane of incidence. Therefore, the inspection subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the inspection subsystem may also include two or more side channels configured as described above. As such, the inspection subsystem may include at least three channels (i.e., one top channel and two side channels), and each of the at least three channels has its own collector, each of which is configured to collect light at different scattering angles than each of the other collectors.

As described further above, each of the detection channels included in the inspection subsystem may be configured to detect scattered light. Therefore, the inspection subsystem shown in FIG. 1 may be configured for dark field (DF) inspection of specimens. However, the inspection subsystem may also or alternatively include detection channel(s) that are configured for bright field (BF) inspection of specimens. In other words, the inspection subsystem may include at least one detection channel that is configured to detect light specularly reflected from the specimen. Therefore, the inspection subsystems described herein may be configured for only DF, only BF, or both DF and BF imaging. Although each of the collectors are shown in FIG. 1 as single refractive optical elements, each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the inspection subsystem may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate image signals or image data. Therefore, the inspection subsystem may be configured to generate images in a number of ways.

It is noted that FIG. 1 is provided herein to generally illustrate a configuration of an inspection subsystem that may be included in the system embodiments described herein or that may generate output that is used by the system embodiments described herein. Obviously, the inspection subsystem configuration described herein may be altered to optimize the performance of the inspection subsystem as is normally performed when designing a commercial inspection system. In addition, the systems described herein may be implemented using an existing system (e.g., by adding functionality described herein to an existing system) such as the Altair series of tools that are commercially available from KLA. For some such systems, the embodiments described herein may be provided as optional functionality of the system (e.g., in addition to other functionality of the system). Alternatively, the inspection subsystem described herein may be designed "from scratch" to provide a completely new inspection subsystem. The inspection subsystem may be further configured as described in U.S. Pat. No. 7,782,452 issued Aug. 24, 2010 to Mehanian et al., which is incorporated by reference as if fully set forth herein.

Computer subsystem 36 may be coupled to the detectors of the inspection subsystem in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions described further herein using the output of the detectors.

The computer subsystems shown in FIG. 1 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer subsystem(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Figure 1A:
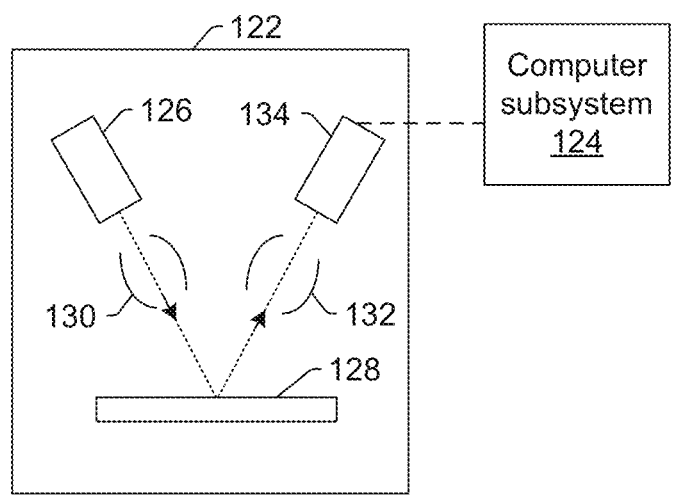

Although the inspection subsystem is described above as being an optical or light-based inspection subsystem, in some embodiments, the inspection subsystem is configured as an electron beam subsystem. In one such embodiment shown in FIG. 1a, the inspection subsystem includes electron column 122 coupled to computer subsystem 124. As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, the electron beam may be directed to and scattered from the specimen at any suitable angles. In addition, the electron beam subsystem may be configured to use multiple modes to generate images of the specimen as described further herein (e.g., with different illumination angles, collection angles, etc.). The multiple modes of the electron beam subsystem may be different in any image generation parameters of the inspection subsystem.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform one or more functions described further herein for the specimen using output generated by detector 134. Computer subsystem 124 may be configured to perform any additional step(s) described herein. A system that includes the inspection subsystem shown in FIG. 1a may be further configured as described herein.

It is noted that FIG. 1a is provided herein to generally illustrate a configuration of an electron beam subsystem that may be included in the embodiments described herein. As with the optical subsystem described above, the electron beam subsystem configuration described herein may be altered to optimize the performance of the inspection subsystem as is normally performed when designing a commercial inspection system. In addition, the systems described herein may be implemented using an existing system (e.g., by adding functionality described herein to an existing system) such as the eSxxx and eDR-xxxx series of tools that are commercially available from KLA. For some such systems, the embodiments described herein may be provided as optional functionality of the system (e.g., in addition to other functionality of the system). Alternatively, the system described herein may be designed "from scratch" to provide a completely new system.

Although the inspection subsystem is described above as being an optical or electron beam subsystem, the inspection subsystem may be an ion beam subsystem. Such an inspection subsystem may be configured as shown in FIG. 1a except that the electron beam source may be replaced with any suitable ion beam source known in the art. In addition, the inspection subsystem may be any other suitable ion beam subsystem such as those included in commercially available focused ion beam (FIB) systems, helium ion microscopy (HIM) systems, and secondary ion mass spectroscopy (SIMS) systems.

As noted above, the inspection subsystem is configured for scanning energy (e.g., light, electrons, etc.) over a physical version of the specimen thereby generating output for the physical version of the specimen. In this manner, the inspection subsystem may be configured as an "actual" subsystem, rather than a "virtual" subsystem. However, a storage medium (not shown) and computer subsystem(s) 102 shown in FIG. 1 may be configured as a "virtual" inspection subsystem configured to generate images of a specimen. In particular, the storage medium and the computer subsystem(s) may be configured as a "virtual" inspection system as described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein, and used as an inspection subsystem in the embodiments described herein. The embodiments described herein may be further configured as described in these patents.

As further noted above, the inspection subsystem may be configured to generate output for the specimen with multiple modes. In general, a "mode" can be defined by the values of parameters of the inspection subsystem used for generating output (e.g., images) for a specimen. Therefore, modes that are different are defined by different values for at least one parameter of the inspection subsystem (other than position on the specimen at which the output is generated). For example, in an optical inspection subsystem, different modes may use at least one different wavelength of light for illumination. The modes may be different in the illumination wavelengths as described further herein (e.g., by using different light sources, different spectral filters, etc. for different modes). In another example, different modes may use different illumination channels of the inspection subsystem. For example, as noted above, the inspection subsystem may include more than one illumination channel. As such, different illumination channels may be used for different modes. The modes may also or alternatively be different in one or more collection/detection parameters of the inspection subsystem. The inspection subsystem may be configured to scan the specimen with the different modes in the same scan or different scans, e.g., depending on the capability of using multiple modes to scan the specimen at the same time.

As described above, traditional, pure die-to-die intensity-difference-based defect detection algorithms are not effective in detecting line opening defects on aWLP specimens due to the reasons shown in FIGS. 2-5. The major impedance is from excessive nuisance induced from random metal line surface roughness and/or inconsistent spatial shift, i.e., although the difference based signal can be detected, the noise in the difference signal could be greater in gray level intensity and geometric size than the real line opening defects. To deal with the line opening defects, the embodiments described herein are specialized inspection methods and systems for detecting line opening defects on RDL lines that may be carried out in a single die-based inspection manner.

Although the embodiments described herein are particularly suitable for detection of line opening defects in RDL lines and some embodiments are described herein with respect to such defects and specimens, the embodiments described herein are not limited to such defects and specimens. For example, the embodiments described herein may be advantageously used for inspection of defects in other relatively high noise patterned features and/or where the defect and the patterned feature have substantially different characteristics in an inspection image.

The computer subsystem(s) are configured for detecting defect candidates on the specimen. "Defect candidates" as that term is used herein is defined as any event detected on a specimen and that is not filtered out as nuisances. For example, after defect detection, the defect candidates may include all of the events that were detected on a specimen and may include both actual defects (or DOIs) and nuisance. After nuisance filtering, the defect candidates will include all of the detected defect candidates that are not eliminated by nuisance filtering. Whether or not the defect candidates after nuisance filtering include only DOIs depends on how good the nuisance filtering is at differentiating between DOIs and nuisances. After all of the nuisance filtering is performed, the remaining defect candidates may be designated as detected defects even if one or more of the designated defects is/are actually nuisance(s).

Detecting the defect candidates includes identifying a patterned feature in a test image included in the images generated of the specimen. The test image may be any test, target, or frame image generated by the inspection subsystem. The test image may have any suitable size and may be a relatively small, patch image, whose size may vary depending on the configuration of the inspection subsystem and/or the computer processing of the output generated by the inspection subsystem.

In one embodiment, the patterned feature includes a line on an RDL layer. In another embodiment, the patterned feature is formed of metal. For example, as described further herein, the specimen for which the embodiments described herein may detect defects may include RDL lines that are formed of metal. As such, the computer subsystem(s) may be configured to identify RDL lines in the test image so that they can be inspected for line opening defects as described further herein. In a similar manner, the computer subsystem(s) may be configured to identify other patterned features formed of metal for inspection.

In some embodiments, identifying the patterned feature includes applying a mask to the test image that separates pixels within the patterned feature in the test image from all other pixels in the test image. In other words, identifying the patterned feature in the test image may include identifying the pixels in the test image that correspond to the patterned feature. One particularly suitable way for doing such identification is by applying a mask to the test image. The mask may have clearly defined and designated area(s) that correspond to the patterned feature and those that do not. For example, the mask may include clear area(s) that correspond to the patterned feature that is being identified and opaque area(s) that do not correspond to the patterned feature (the opaque area(s) may include patterned features that are not of interest, underlying or non-patterned areas, etc.). In general, the mask may have any suitable configuration known in the art. Applying the mask to the test image may include overlaying the mask on the test image and then aligning the test image to the mask. Such overlaying and aligning may be performed in any suitable manner known in the art.

Although the identifying step is described herein with respect to a patterned feature, the identifying step may actually include identifying more than one patterned feature of interest in the same test image, which may have the same characteristics or different characteristics (e.g., two or more RDL lines that have the same characteristics, two or more RDL lines, at least some of which have different shapes, orientations, sizes, etc. from one another). In other words, the identifying step is described with respect to a patterned feature to simplify and clarify the understanding of the invention. However, the identifying step may be performed for more than one patterned feature simultaneously or sequentially. In a similar manner, although the invention may be described herein with respect to a test image for the sake of clarity and simplicity, the steps described herein may be performed for more than one test image sequentially or simultaneously. The test images may include test images generated at the same within die positions in one or more dies on the specimen or different within die positions in one or more dies on the specimen, which means that the test images may not contain the same patterned features as each other. The test images may further include any of the test images described above and generated using one or more modes of the inspection subsystem.

In one such embodiment, the one or more computer subsystems are configured for generating the mask from a design for the specimen. In this manner, the embodiments described herein may utilize design information for RDL line mask generation. For example, since the Kronos™ 1080 wafer-level packaging inspection systems, which are commercially available from KLA, the FlexPoint™ algorithm architecture (which is a feature for adaptive inspection with the introduction of the Kronos™ 1080 product from the Altair product line) provides median intensity-based segmentation for separating the RDL lines and spaces between the lines. FlexPoint™ greatly improved the sensitivity-nuisance trade-off for Altair inspection tools, particularly in the space area, where the image intensities are usually relatively quiet, so that bridges between RDL lines are easily detected. However, the inventors have also found that it can be difficult to generate clear line masks due to RDL LER. Some 89xx tools that are commercially available from KLA will include a feature that allows users to generate the FlexPoint™ masks (for RDL lines/spaces) based on the design information (e.g. GDS files), which may be provided by users. The generation of such masks is advantageously much faster, cleaner, and immune from the RDL LER than generating masks from specimen images. With design-based FlexPoint™ masks, RDL line openings in addition to bridges in RDL spaces can be detected by the embodiments described herein. FlexPoint™ mask generation using design information may be performed as described in commonly assigned U.S. patent application Ser. No. 16/901,102 by Zhang et al. filed Jun. 15, 2020, which is incorporated by reference as if fully set forth herein, and the feature will be available on the 89xx tools commercially available from KLA as the DesignWise™ feature. The embodiments described herein may be further configured as described in this patent application.

For handling the detection of line opening defects in RDL lines, the embodiments described herein can benefit from the relatively quick and easy generation of the design-based RDL line and space masks. An immediate advantage of using design-based FlexPoint™ mask generation is that the embodiments do not rely on the pure, total image intensity to perform patch-to-mask alignment (PMA), a component in the FlexPoint™ feature to accurately place a mask on an image. Therefore, ambiguity or confusion from RDL to previous layer shift (as shown in FIG. 3) will not impact the alignment process.

In another such embodiment, the mask separates pixels within portions of the patterned feature having different orientations into different regions, and the determining and detecting steps described further herein are performed separately for the different regions. For example, RDL line portions having different orientations can be easily assigned different region mask IDs, thus different inspection algorithms and associated parameters can be applied. A design-based RDL line/space mask can be overlaid on top of a median reference die (MRD) image, which may be generated in any suitable manner known in the art. Different colors or other suitable indicia may be used to represent different region IDs. Pixels without a colored mask or other indicia may be of un-inspected regions, i.e., regions not of interest or do not care areas.

Figure 6:
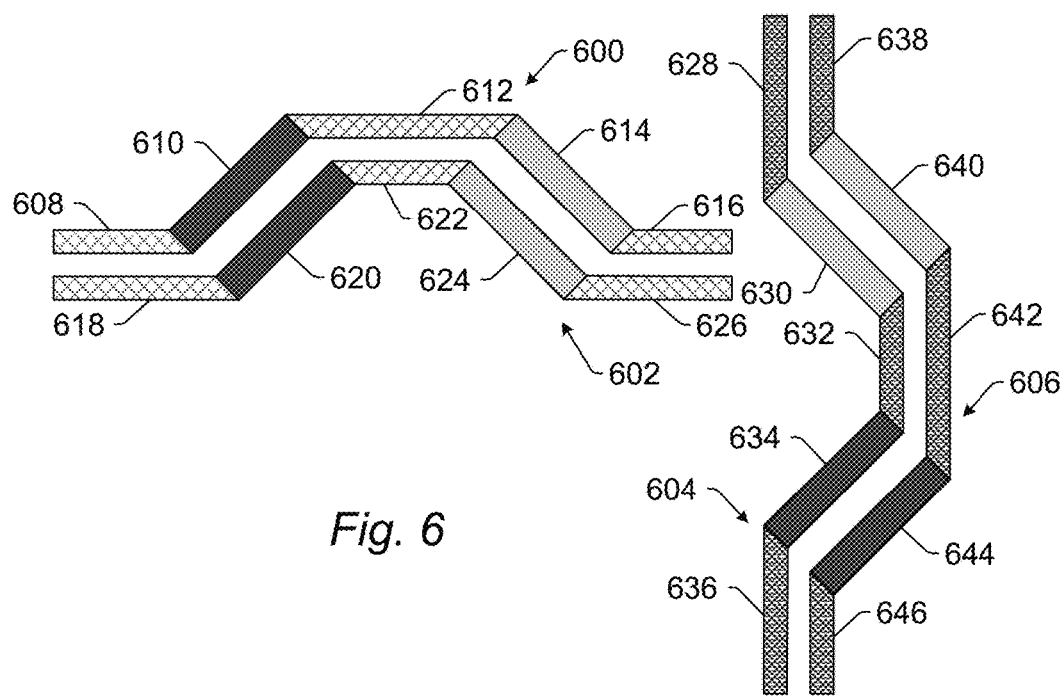
FIG. 6 is a schematic diagram illustrating a plan view of one example of portions of different patterned features having different orientations.

As shown in FIG. 6, with the design information, we can easily separate continuous RDL lines into different regions with different orientations, e.g., horizontal, vertical, 45-degree diagonal, and 135-degree diagonal, in addition to the space in between the RDL lines. In particular, FIG. 6 shows examples of different patterned features 600, 602, 604, and 606 with portions of the patterned features having different orientations separated into different regions. Patterned feature 600 includes portions 608, 612, and 616 that have horizontal orientations, portion 610 having a 45 degree diagonal orientation, and portion 614 having a 135 degree diagonal portion. Patterned feature 602 includes portions 618, 622, and 626 having a horizontal orientation, portion 620 having a 45 degree diagonal orientation, and portion 624 having a 135 degree diagonal orientation. Patterned feature 604 includes portions 628, 632, and 636 having a vertical orientation, portion 630 having a 135 degree diagonal orientation, and portion 634 having a 45 degree diagonal orientation. Patterned feature 606 includes portions 638, 642, and 646 having a vertical orientation, portion 640 having a 135 degree diagonal orientation, and portion 644 having a 45 degree diagonal orientation.

Portions of the patterned feature(s) having the same orientation may be separated into the same region, and portions of the patterned feature(s) having different orientations may be separated into different regions. In one such example, pixels in portions 608, 612, and 616 of patterned feature 600 may be separated into a first region, pixels in portion 610 of patterned feature 600 may be separated into a second region, and pixels in portion 614 of patterned feature 600 may be separated into a third region. The pixels in portions of other patterned features shown in FIG. 6 may be separated in a similar way with regions being separately generated for each patterned feature.

The pixels in portions of multiple patterned features having the same orientation may be separated into the same regions. For example, pixels in portions 608, 612, and 616 of patterned feature 600 and portions 618, 622, and 626 of patterned feature 602 may be separated into a first region. Pixels in portion 610 of patterned feature 600, portion 620 of patterned feature 602, portion 634 of patterned feature 604, and portion 644 of patterned feature 606 may be separated into a second region. Pixels in portion 614 of patterned feature 600, portion 624 of patterned feature 602, portion 630 of patterned feature 604, and portion 640 of patterned feature 606 may be separated into a third region. Pixels in portions 628, 632, and 636 of patterned feature 604 and portions 638, 642, and 646 of patterned feature 606 may be separated into a fourth region.

Different region IDs may be defined for different line segments for entire RDL lines, and they may be represented by different fill patterns as shown in FIG. 6 or in another way such as with different mask colors. The one or more computer subsystems can easily generate and use the masks as described herein with the DesignWise™ feature using appropriate RDL extracting rule scripts. Setup of the mask may be performed during recipe setup time.

Figure 7:
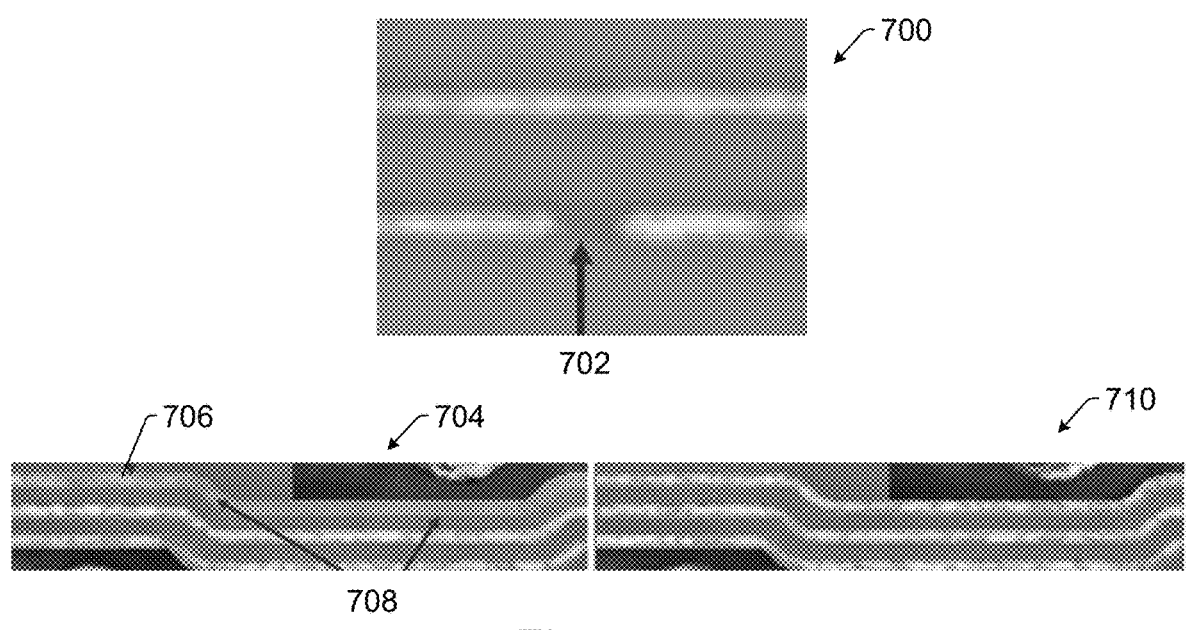
FIG. 7 includes images illustrating examples of different types of defects in RDL lines.

For at least one pixel in the test image located within the patterned feature, detecting the defect candidates includes determining a difference between a characteristic of the at least one pixel and the characteristic of other pixels in the test image located within a predetermined window of the at least one pixel and detecting a defect candidate at the at least one pixel based on the determined difference. These steps explore and utilize the structural continuity/discontinuity in RDL lines/spaces and RDL line/space specific noise statistics for detecting defects such as line opening defects. A goal in these steps may be to detect line opening defects with the help of the RDL line masks as described above. As described above, the difference intensity from die-to-die or other test-to-reference comparisons will produce too many noises due to RDL line roughness. However, by looking at the test image itself, it is clear that the line opening defect signal is there. For example, FIG. 7 includes test images that clearly show line opening defects. In particular, test image 700 shows relatively small line opening defect 702. Test image 704 shows faded line defect 706 and relatively large lost line defect 708, in both a diagonal segment of a line and another horizontal segment of the line, which are not visible in reference image 710. The roughness of the lines in these images is also very clear.

The embodiments described herein use the characteristics of the structural continuity/discontinuity to detect the line opening defects. There are two observations of the RDL line structure that are pertinent to the steps described herein. One observation is that, for the pixels in the line opening defect area, those pixels "belong to" the spaces which usually have lower and/or more uniform intensity in BF mode than the lines. The second observation is that, for the pixels near the edge of the RDL lines, the intensity usually has a dip, i.e., it is lower than the intensity of pixels in the interior of the lines but higher than the intensity of the pixels in the spaces.

As described above, in one embodiment, the mask separates pixels within portions of the patterned feature having different orientations into different regions, and, in some such embodiments, the determining and detecting steps described further herein are performed separately for the different regions. For example, with the convenience of the design based FlexPoint™ mask (native inspection pixel based), the embodiments described herein can easily identify whether a pixel in a frame belongs to horizontal RDL lines, vertical RDL lines, 135-degree RDL lines, 45-degree RDL lines, spaces between RDL lines, spaces between RDL lines having different orientations, do not care areas, etc., with an accuracy of +/−1 pixel. The steps described herein may then be performed separately for different regions of the lines and spaces having different orientations, possibly with one or more different parameters such as different predetermined window sizes, different thresholds, different sensitivities, etc. For example, regions of the lines having a vertical orientation may be inspected with a first predetermined window size and shape and a first threshold or sensitivity, and regions of the lines having a horizontal orientation may be inspected with a second predetermined window size and shape and a second threshold or sensitivity. Other parameters of the steps described herein may be similarly varied. The parameters may also be varied for other patterned structures and orientations described herein.

In one such embodiment, the one or more computer subsystems are configured for independently determining one or more characteristics of the predetermined window used for the determining step performed separately for the different regions. For example, the predetermined window size used for determining the spatial discontinuity may be defined in the inspection recipe for different RDL line segments. Each type of line segment can have its own specific window size definition. The window size definitions may be determined in a recipe setup phase.

Figure 11:
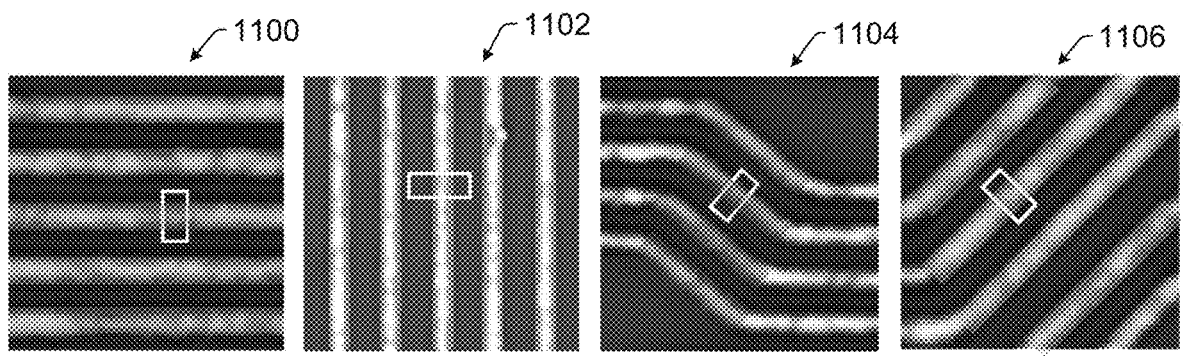
FIG. 11 includes examples of test images of different patterned features and embodiments of predetermined windows overlaid thereon having different characteristics depending on the orientation of the different patterned features.

FIG. 11 shows different predetermined window size definitions for different RDL line segments. The predetermined windows are shown in these images by the areas outlined in white. For example, image 1100 shows a predetermined window size definition for a horizontal line segment. Image 1102 shows a predetermined window size definition for a vertical line segment. Image 1104 shows a predetermined window size definition for a 135 degree diagonal RDL line segment, and image 1106 shows a predetermined window size definition for a 45 degree diagonal RDL line segment.

In one embodiment, determining the difference includes determining a range of the characteristic of the at least one pixel and the other pixels within the predetermined window, the range is a difference between maximum and minimum values of the characteristic of the at least one pixel and the other pixels within the predetermined window, and detecting the defect candidate includes applying a threshold to the range. Two embodiments of approaches are described herein for single die-based inspection. This approach uses a spatial continuity metric based on the spatial range window (i.e., the predetermined window). Based on the above two observations, for each pixel on an RDL line, we can devise a spatial window centered around the pixel on RDL line segments and calculate the range (difference between maximum and minimum intensity pixels).

Figure 8:
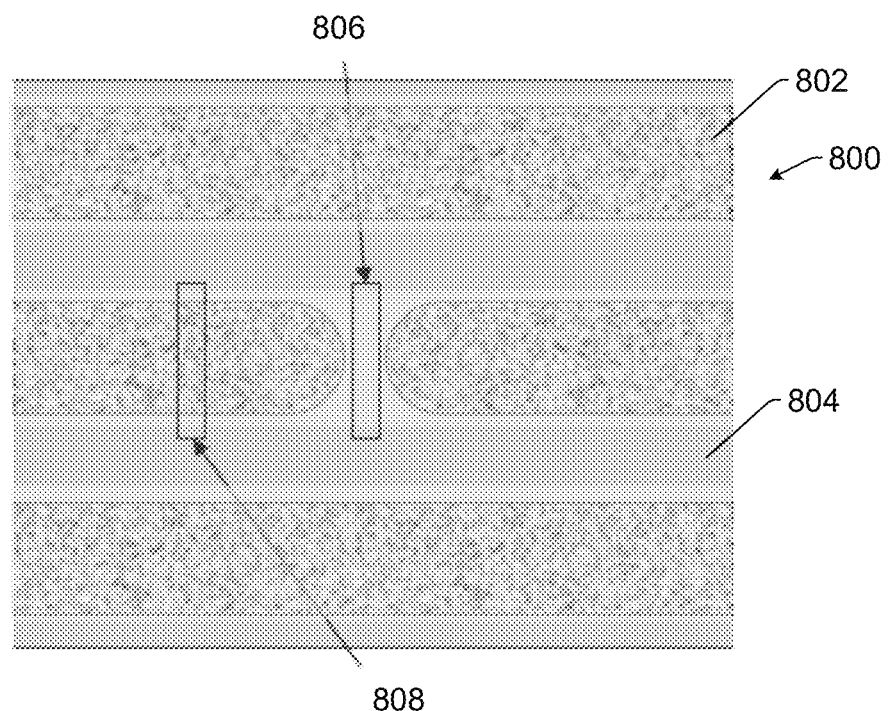
FIG. 8 is a schematic diagram illustrating a plan view of examples of patterned features with predetermined windows overlaid thereon within which a difference may be determined as described herein and used for detecting defect candidates in the patterned features.
Figure 8:
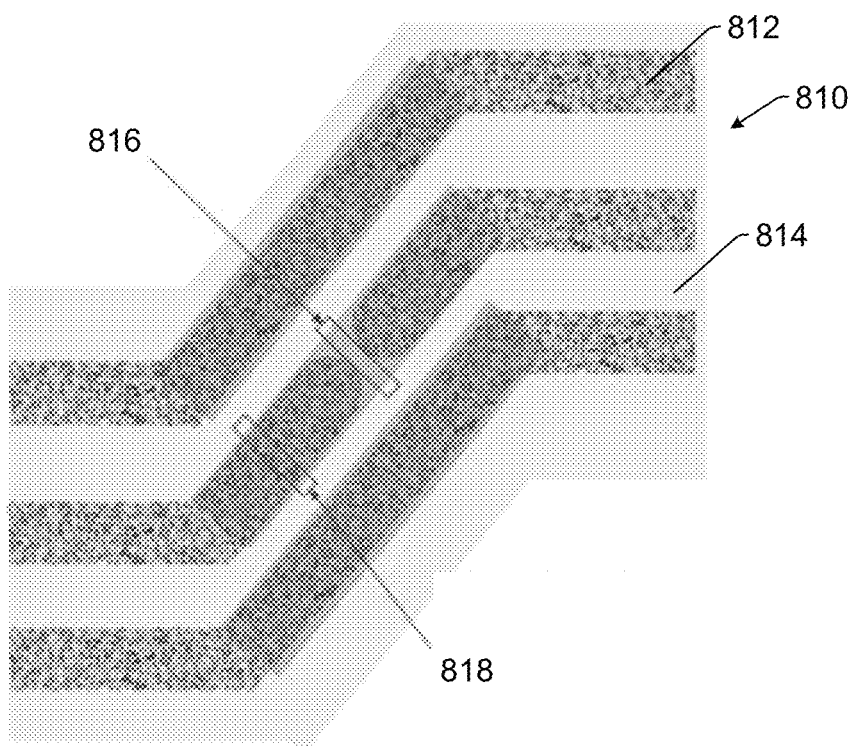

FIG. 8 shows how this approach can successfully detect defects on RDL lines. In particular, FIG. 8 shows example 800 of using range as a metric to detect the structural discontinuity due to a line opening defect in a horizontal RDL line and example 810 of using range as a metric to detect the structural discontinuity of a line opening defect in a diagonal RDL line. Example 800 includes images of lines 802 and spaces 804 and two predetermined windows 806 and 808 overlaid on different portions of one of the lines. Predetermined windows 806 and 808 are just two instances of the same predetermined window shown centered on different pixels within one of the lines. Example 810 includes images of lines 812 and spaces 814 and two predetermined windows 816 and 818 overlaid on one of the lines. As above, predetermined windows 816 and 818 are just two instances of the same predetermined window shown centered on different pixels within one of the lines. The range values determined for the pixels centered in predetermined windows 806 and 816 will be relatively low because the pixels in these predetermined windows are all in a relatively low intensity and quiet space. In contrast, the range values determined in predetermined windows 808 and 818 are relatively high. For example, based on the light level setting of the inspection subsystem used for inspection images, the ranges can be a maximum of the bright line structure and dim space background.

FIG. 8 shows that with this predetermined window, the embodiments described herein can detect the RDL discontinuity with relatively low computation cost. Of course, the sensitivity with which such RDL line opening defects are detected is dependent upon the window size. If the window size is too large, it could miss some substantially small line openings. If it is too small, it could introduce nuisances. However, this detection method itself is not necessarily aiming at substantially high capture rate with zero or extremely low nuisance rate. Instead, this detection approach can be used as a "cheap and fair" RDL line opening detection method. Other steps described herein may be performed to separate the detected defect candidates into nuisances and defects.

In another such embodiment, the one or more computer subsystems are also configured for determining if the defect candidate is a defect based on one or more characteristics of the defect candidate. For example, such a detection method may be combined with some morphological postprocessing to remove relatively small line opening nuisances and/or assigning final defect classifications through iDO, a defect classification module available on some tools commercially available from KLA, or deep learning (DL) based binning to remove excessive nuisance and retain the real line opening DOI. Such morphological postprocessing and defect classification or binning may be performed as described further herein.

In one such embodiment, the defect candidate includes a complete opening in the patterned feature. For example, the first approach described above is relatively simple and fast and will detect less nuisances than other currently used methods and systems for RDL line inspection, but its performance is good for complete line openings but not necessarily for partial line openings.

The second approach is based on difference of pixel intensity with respect to the mean intensity in a patterned feature and possibly in the same corresponding RDL line segment in each die frame (which may be simply referred to herein as "Single Die Diff-to-Mean" or "SDDifftMean"). For example, in another embodiment, determining the difference includes determining a difference between the characteristic of the at least one pixel and a mean of the characteristic of the at least one pixel and the other pixels within the predetermined window. The mean and the difference between the characteristic of the pixel and the mean may be determined in any suitable manner.

In one such embodiment, the predetermined window encompasses an entirety of the patterned feature in the test image. For example, unlike the first approach, the predetermined window within which the difference is determined may include an entirety of the patterned feature in the test image. In particular, the mean of the characteristics, e.g., intensities, of all of the pixels in the identified patterned feature may be determined, and then the difference between the characteristic of any one pixel in that patterned feature and that mean may be determined and used for the detecting step described herein. Such an embodiment may be suitable when the entirety of the patterned feature in the test image has a single orientation, like the lines shown in example 800 of FIG. 8.

In another such embodiment, the predetermined window encompasses an entirety of the patterned feature in the test image and one or more other entire patterned features in the test image, and the one or more other entire patterned features have a type and orientation that are the same as the patterned feature. For example, if a test image includes more than one patterned feature having the same type and orientation, e.g., the lines shown in example 800 of FIG. 8, the mean of the characteristics of all of the pixels in all of those patterned features in the test image may be determined, and then the difference between the characteristic of any one pixel in those patterned features and that mean may be determined and used for the detecting step described herein. Determining the mean from more than one (or all) of the patterned features in a test image having the same type and orientation may provide advantages for the detecting steps described herein, e.g., the mean may be more stable and less responsive to the noise in the patterned features. In addition, determining the mean from only the patterned feature or features in the test image (and not from any other images generated for the specimen such as other test images or a reference image) may advantageously reduce the impact of non-defect within- or across-specimen variation on the mean.

The predetermined window may be similarly varied for different portions of patterned features having different orientations and separated into different regions of pixels. For example, a mean may be determined from all pixels in horizontally oriented segments of RDL lines in a test image, another mean may be determined from all pixels in vertically oriented segments of RDL lines in the test image, etc. The mean that is used for determining a difference for any one pixel may then be selected based on the segment of the RDL line that the pixel is located in. In other words, if a pixel in a test image is located in a vertically oriented segment of an RDL line, the mean determined from all (or at least some) of the vertically oriented segments of the RDL lines in the test image may be selected and used for determining the difference for the pixel.

In a further such embodiment, detecting the defect candidate includes determining a standard deviation from the mean and the characteristic of the at least one pixel and the other pixels within the predetermined window, determining a signal strength by dividing the difference by the standard deviation, and applying a threshold to the signal strength. The concept is relatively simple: the mean intensity and standard deviation of intensity may be calculated for each group of line segments (e.g., horizontal, vertical, 135-degree diagonal, and 45-degree diagonal RDL segments) in each frame. Then, the inspection is simply seeking the relative strength of each pixel as described in the following equation for corresponding line segments:

$$\text{Signal\_strength} = (\text{pixel\_intensity} - \text{mean\_intensity}) / \text{standard\_deviation}.$$

If the signal strength is greater than the prescribed threshold (specific to polarity, dark defects and bright defects have their different thresholds), then the pixel is abnormal. This method is simple conceptually but can be relatively expensive in computation. For example, this method may include two frame pixel visiting passes, the first pass is for collecting noise statistics (e.g., mean and standard deviation) in each region or group, while the second pass is for relative strength calculation and anomaly detection. The mean and the standard deviation may otherwise be determined in any suitable manner known in the art.

In one such embodiment, the one or more computer subsystems are further configured for determining the mean and the standard deviation from a median reference image generated for the test image. For example, the corresponding parameter of the range of mean intensity in the space segments may be automatically calculated using the RDL space segment mask and the underneath MRD image. An MRD image may be generated in any suitable manner known in the art. This step may be performed during recipe setup time.

In an optional step performed depending on throughput optimization, after the mask is generated from the RDL line segments design polygons (meaning that the design of the RDL polygons are already aligned with the RDL line structure in the MRD image), the mean and standard deviation of the pixel intensity of horizontal, vertical, 45-degree and 135-degree diagonal RDL line segments are calculated, and similar calculations may be performed for those pixels in the space segments between RDL line segments. These steps may be performed during recipe setup time.

In another such embodiment, the one or more computer subsystems are configured for determining the mean and the standard deviation from the test image. For example, the mean and the standard deviation may be determined as described above from a single test image and will provide the same advantages described above. In this manner, the embodiments described herein may provide true single die image (SDI) defect detection.

Figure 9:
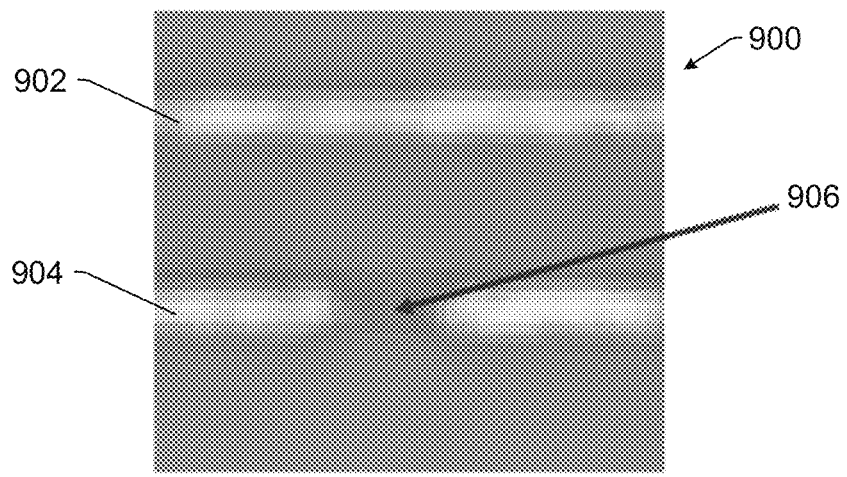
FIGS. 9 and 10 include examples of test images for different defects that can be detected as described herein.
Figure 9:
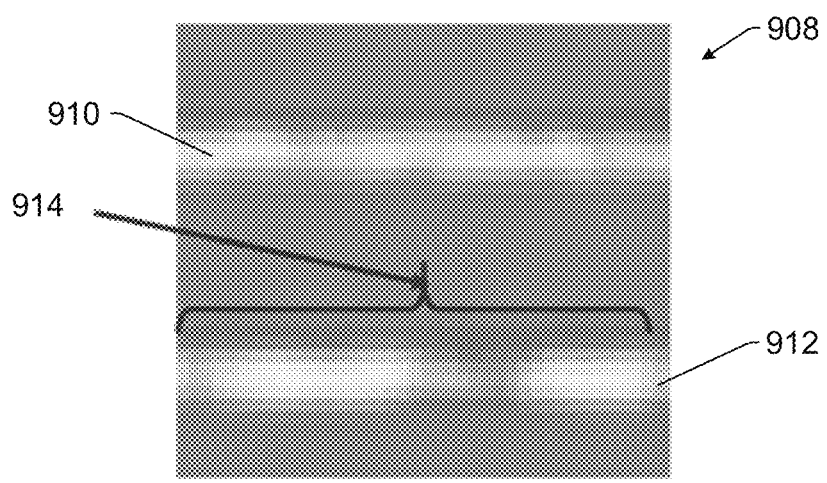

In some embodiments, identifying the patterned feature includes applying a mask to the test image that separates pixels within the patterned feature in the test image from all other pixels in the test image and pre-processing results of applying the mask to identify one or more pixels beyond one or more edges of the patterned feature and to remove the identified one or more pixels from the pixels within the patterned feature. In another embodiment, identifying the patterned feature includes applying a mask to the test image that separates pixels within the patterned feature in the test image from all other pixels in the test image and post-processing results of applying the mask to identify one or more pixels beyond one or more edges of the patterned feature and to remove the identified one or more pixels from the pixels within the patterned feature. In these embodiments, the mask may be applied to the test image as described further above and either pre-processing or post-processing (or even both) may be applied to the results of the mask application to address any marginalities in that step. For example, due to system limitations, mask placement accuracy may be about +/−1.5 pixels for most systems. As can be seen in FIG. 9 described further below, at the zoomed level, there can be extra space pixels included in the RDL line segments. Those extra space pixels will contribute to excessive nuisance detection. Thus, a more robust preprocessing or postprocessing would be advantageous for mitigating that nuisance detection. There are two ways to deal with these extra space pixels: (1) pre-processing the RDL line segment mask to remove space pixels in the line segments; and (2) postprocessing to remove the excessive space pixels that have lower intensity. Either way, the operation involves a more expensive calculation than the first approach described herein. The pre- and post-processing steps may otherwise be performed in any suitable manner known in the art.

In particular, FIG. 9 shows two test images 900 and 908 generated for a specimen. Test image 900 includes two RDL lines 902 and 904 with line opening defect 906 in RDL line 904. Test image 908 also includes two RDL lines 910 and 912, neither of which includes a line opening defect. However, the relative signal strength determined for these images as described herein will result in detection of both the line opening DOI in test image 900 and nuisances at RDL line edge 914. In other words, the SDDifftMean method for RDL line opening detection provides effective detection of line opening and partial line opening defects but can also detect excessive nuisance for pixels at the RDL line edge. Therefore, the pre- and post-processing steps described above can be important nuisance reduction techniques for the embodiments described herein.

Figure 10:
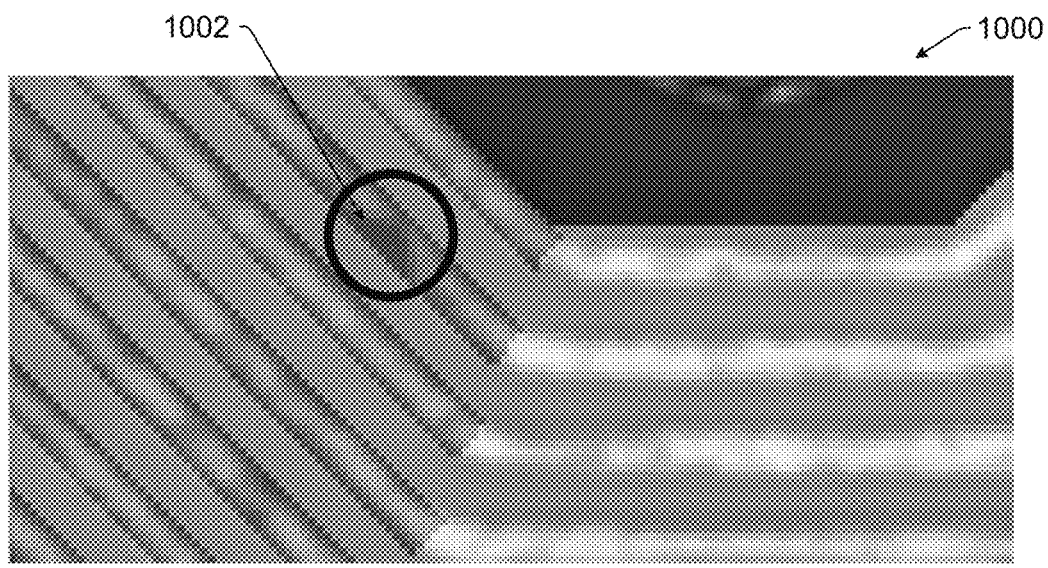

In a further embodiment, the defect candidate includes a complete or partial opening in the patterned feature. For example, the SDDifftMean method is capable of detecting both complete line opening defects and also relatively larger partial line openings as shown in FIG. 10. In particular, the SDDifftMean method is capable of detecting both complete line opening defects such as line opening defect 906 shown in test image 900 of FIG. 9 as well as partial line opening defects such as that shown in circled portion 1002 of test image 1000 shown in FIG. 10. In this manner, the relative signal strength determined by the SDDifftMean method can detect partial line openings.

In some embodiments, the one or more computer subsystems are configured for determining if the defect candidate is a defect by performing a morphological operation on results of the detecting step. For example, the embodiments described herein may use a morphological operation to remove relatively small-numbered candidate pixel cliques. In both single-die-based RDL line opening candidate detection methods described herein, it is unavoidable that both methods will not provide DOI only capture. Both methods provide better DOI capture rate vs. nuisance rate than traditional die-to-die difference-based inspection methods. The latter usually overwhelms inspection with huge nuisance detection so that the detection of real DOI becomes impossible. The new single die-based methods, either spatial discontinuity based or relative signal strength based will give much better capture rate at much lower nuisance rate. However, for production worthy wafer inspection, the nuisance is preferably further reduced. One observation of such nuisance is that they are usually sporadically spreading and with relatively small pixel counts cliques. As such, a morphological operation can be performed to remove the relatively small sized nuisances. Such morphological operation based nuisance filtering can reduce substantial amounts of nuisance at the inspection postprocessing stage. Analyzing defect candidates for their morphological properties and using those morphological properties to separate probable nuisances from probable DOIs may otherwise be performed in any suitable manner.

In an additional embodiment, the one or more computer subsystems are configured for determining if the defect candidate is a defect by binning the defect candidate based on the test image. In another embodiment, the one or more computer subsystems are configured for determining if the defect candidate is a defect by applying a deep learning (DL) based classifier to the test image. For example, the embodiments may use iDO based binning or DL based binning to further remove the nuisance. In one such example, there are some structures that are relatively large in spatial dimension but visually can be identified as nuisance by their appearance, for example, RDL line edge roughness vs. partial line opening, or line bending. iDO inline binning may be used to filter out potential nuisance at each parallel processing unit level. If DOI and nuisance are visually differentiable, DL binning using defect candidate patches may have a better nuisance reduction result than the iDO classifier. DL based binning may be performed as described in U.S. Pat. No. 10,607,119 issued to He et al. on Mar. 31, 2020, which is incorporated by reference as if fully set forth herein. DL based nuisance filtering may be performed as described in U.S. patent application Ser. No. 16/663,283 by Huang et al. filed Oct. 24, 2019, which is incorporated by reference as if fully set forth herein. The embodiments described herein may be further configured as described in this patent and patent application.

In one embodiment, the determining and detecting steps are performed without a reference image. In other words, detecting the defect candidates may include single image defect detection, rather than requiring two die images as in die-to-die inspection or a test and reference image as in die-to-reference inspection. For example, metal grain is the major nuisance in back end wafer inspection. Since metal grain is randomly distributed across specimens such as wafers (e.g., across all the dies on a wafer), metal grain cannot be canceled by die-to-die differences. In particular, difference images generated by die-to-die subtractions for metal layers will include grain noise that cannot be canceled by the subtractions and that can be detected as events. In fact, the die-to-die difference based approach can amplify the noise from metal grain thereby making it impossible to detect the DOI. So currently used die-to-die defect approaches for detection and binning will not work for such specimens. As such, the embodiments described herein may be configured for detecting and classifying defects in one die without using any reference dies, whether from adjacent dies or a standard reference die. The embodiments described herein may detect DOI candidates and separate true DOI from metal grain nuisance by single die defect patch images through DL or in another manner described further herein.

Figure 12:
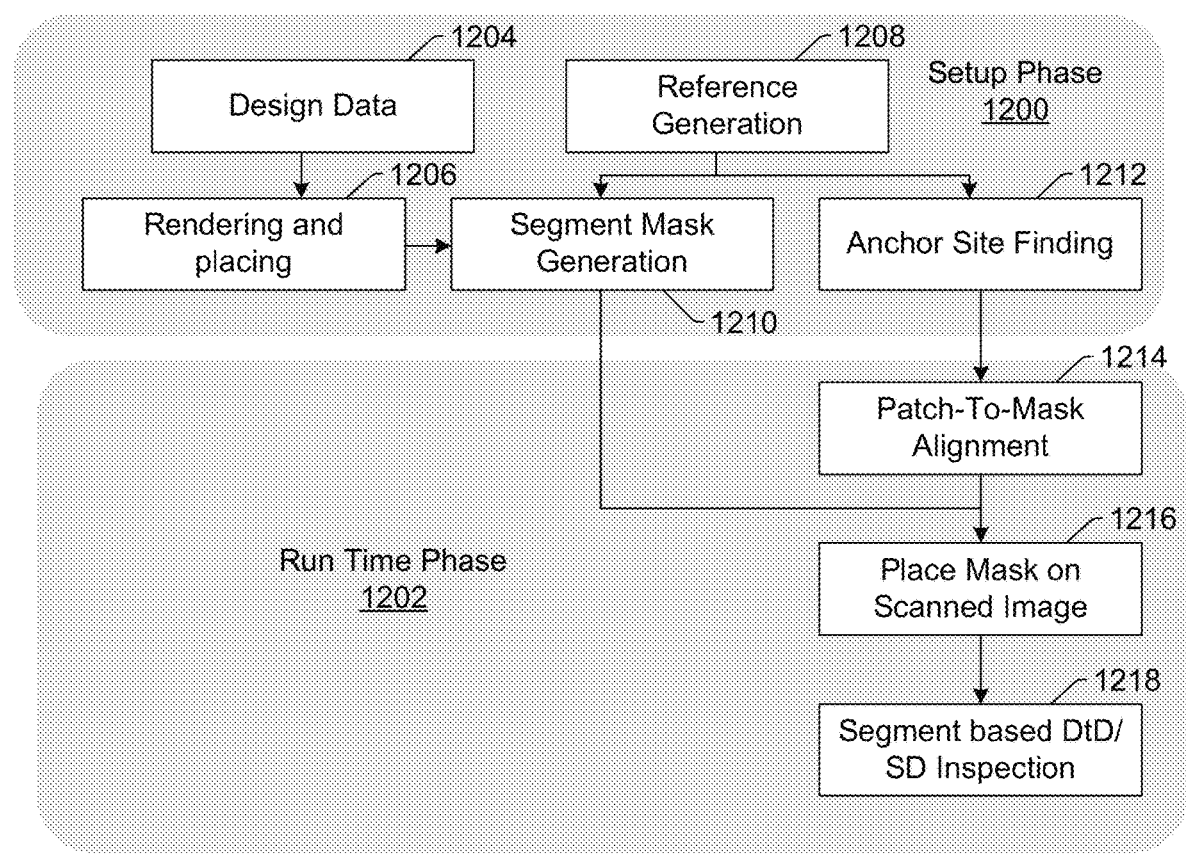
FIGS. 12-14 are flow charts illustrating embodiments of steps that may be performed by the embodiments described herein for detecting defects on a specimen.

FIG. 12 illustrates one embodiment of steps that may be performed for detecting defects as described herein. The steps may be performed in two different phases, setup phase 1200 and run time phase 1202. During the setup phase, the one or more computer subsystems may use design data 1204, e.g., a GDS file, as input for rendering and placing step 1206, which may be performed in any suitable manner known in the art. In the setup phase, the one or more computer subsystems may also perform reference generation step 1208, which may include generating an MRD or another type of reference for the specimen inspection. The results of the reference generation step and the rendering and placing step may be used by the computer subsystem(s) for segment mask generation step 1210, which may include generating one of the segment masks described herein. The computer subsystem(s) may also use reference generation step 1208 output for anchor site finding step 1212 in which anchor sites are selected in the generated reference. The anchor sites may then be used in the inspection process to align the images generated by the inspection subsystem to a common reference.

At the run time of inspection, the recipe parameters may be sent down to each CPU core that are running the inspection. In the runtime phase, additional recipe parameters associated with different RDL line/space segments may be sent down to the inspection computer along with the mask for use in the inspection. In the runtime phase, the one or more computer subsystems use the output of the anchor site finding step to perform patch-to-mask alignment step 1214 in which the images generated by the inspection subsystem are aligned to the mask so that the patterned features in the images can be identified as described further herein by place mask on scanned image step 1216. As shown in step 1218, the one or more computer subsystems then perform segment based die-to-die (DtD) difference intensity based inspection or single die (SD) inspection as described herein. For example, in the runtime phase, the segment based DtD/SD target intensity based inspection step may include either traditional die-to-die inspection with segment mask or performing the new segment mask guided single die inspection with one of the two approaches described further herein: (1) spatial window for structural continuity; and/or (2) difference between pixel intensity and its mean intensity in the same segment possibly normalized by the standard deviation of the same segment.

Figure 13:
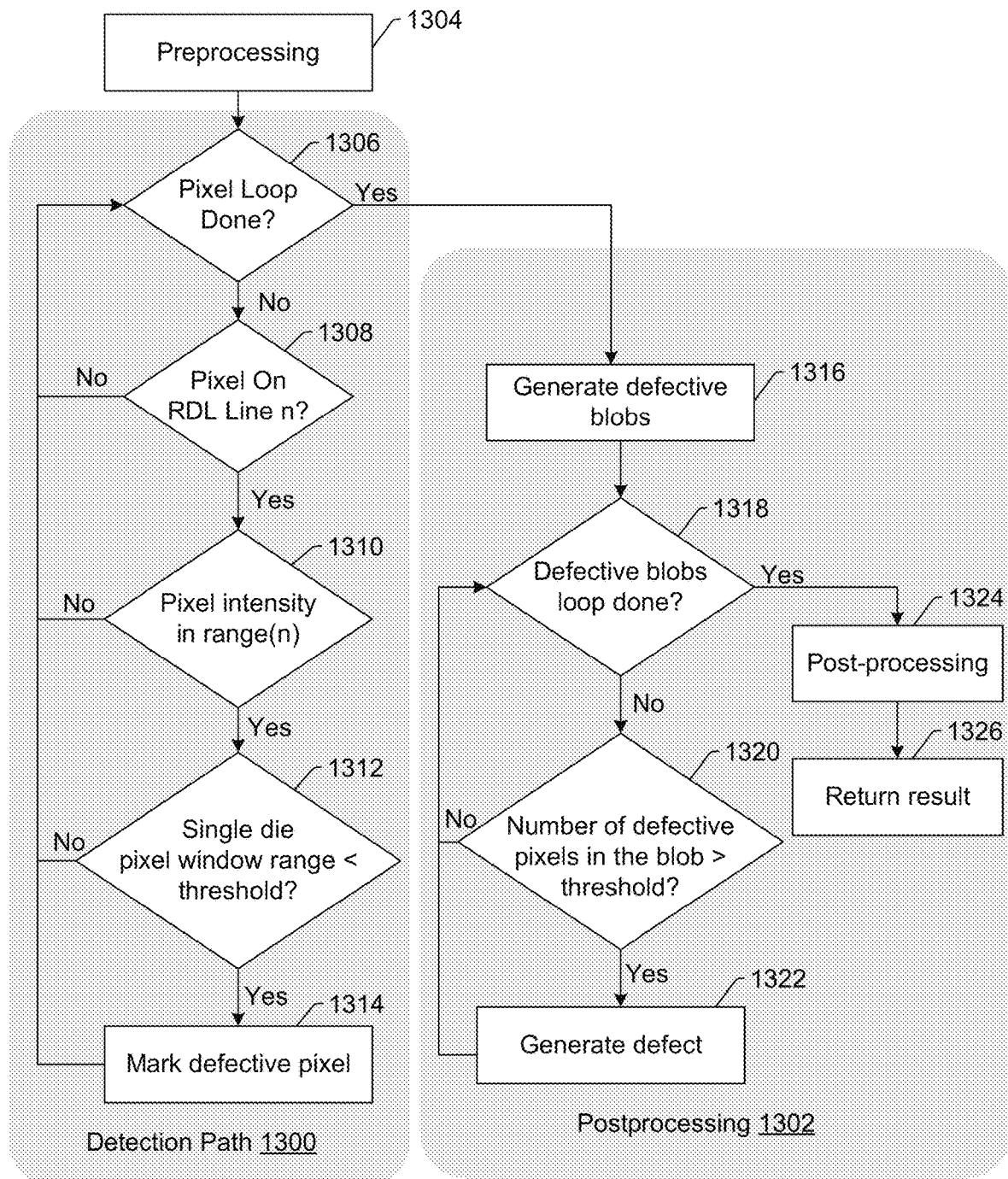

FIG. 13 illustrates an embodiment of steps that may be performed by the embodiments described herein for the "spatial continuity" based single die RDL line opening detection. As shown in FIG. 13, the steps are performed in two phases, detection path phase 1300 and postprocessing phase 1302. The one or more computer subsystems perform preprocessing step 1304, which may include any of the preprocessing steps described herein. After the preprocessing step is completed, the detection path may start with determining if the pixel loop is done, as shown in step 1306. Performing a "pixel loop" means to loop through (visit) each pixel in a job frame, patch image, test image, etc. If the pixel loop is done, then the one or more computer subsystems proceed to the postprocessing phase.

If the pixel loop is determined to not be done, then the one or more computer subsystems determine if a pixel is on RDL line n, as shown in step 1308. If the pixel is not on an RDL line, the one or more computer subsystems repeat step 1306. If the pixel is determined to be on an RDL line, the computer subsystem(s) determine if an intensity of the pixel is within a range(n), as shown in step 1310. A pixel intensity within range may be defined as an intensity that is greater than a minimum of the range setting and less than a maximum of the range setting. If the pixel is not in the range(n), the one or more computer subsystems return to step 1306. If the pixel intensity is determined to be within range(n), the one or more computer subsystems determine if the single die pixel window range is less than a threshold, as shown in step 1312. A single die pixel window range that is less than a threshold means that the maximum intensity of the neighborhood pixels—the minimum intensity of the neighborhood pixels is less than a threshold setting. If the single die pixel window range is not less than the threshold, the one or more computer subsystems return to step 1306. If the single die pixel window range is determined to be less than the threshold, the one or more computer subsystems mark the pixel as defective, as shown in step 1314. After step 1314, the one or more computer subsystems return to step 1306.

When the one or more computer subsystems determine that the pixel loop is done in step 1306, the one or more computer subsystems generate defective blobs in step 1316 of postprocessing phase 1302. The one or more computer subsystems then determine if the defective blobs loop is done in step 1318. If the defective blobs loop is determined to not be done, the one or more computer subsystems determine if the number of defective pixels in the blob is greater than a threshold, as shown in step 1320. If the number of defective pixels in the blob is not greater than the threshold, the one or more computer subsystems return to step 1318. If the number of defective pixels in the blob is greater than the threshold, the one or more computer subsystems generate a defect, as shown in step 1322. After the one or more computer subsystems generate a defect, the one or more computer subsystems return to step 1318. When the one or more computer subsystems determine that the defective blobs loop is done, the one or more computer subsystems perform post-processing step 1324, which may include any of the post-processing steps described herein. The one or more computer subsystems then perform return result step 1326, in which the results of any of the steps performed by the computer subsystem(s) are output as an inspection results file or another suitable file.

Figure 14:
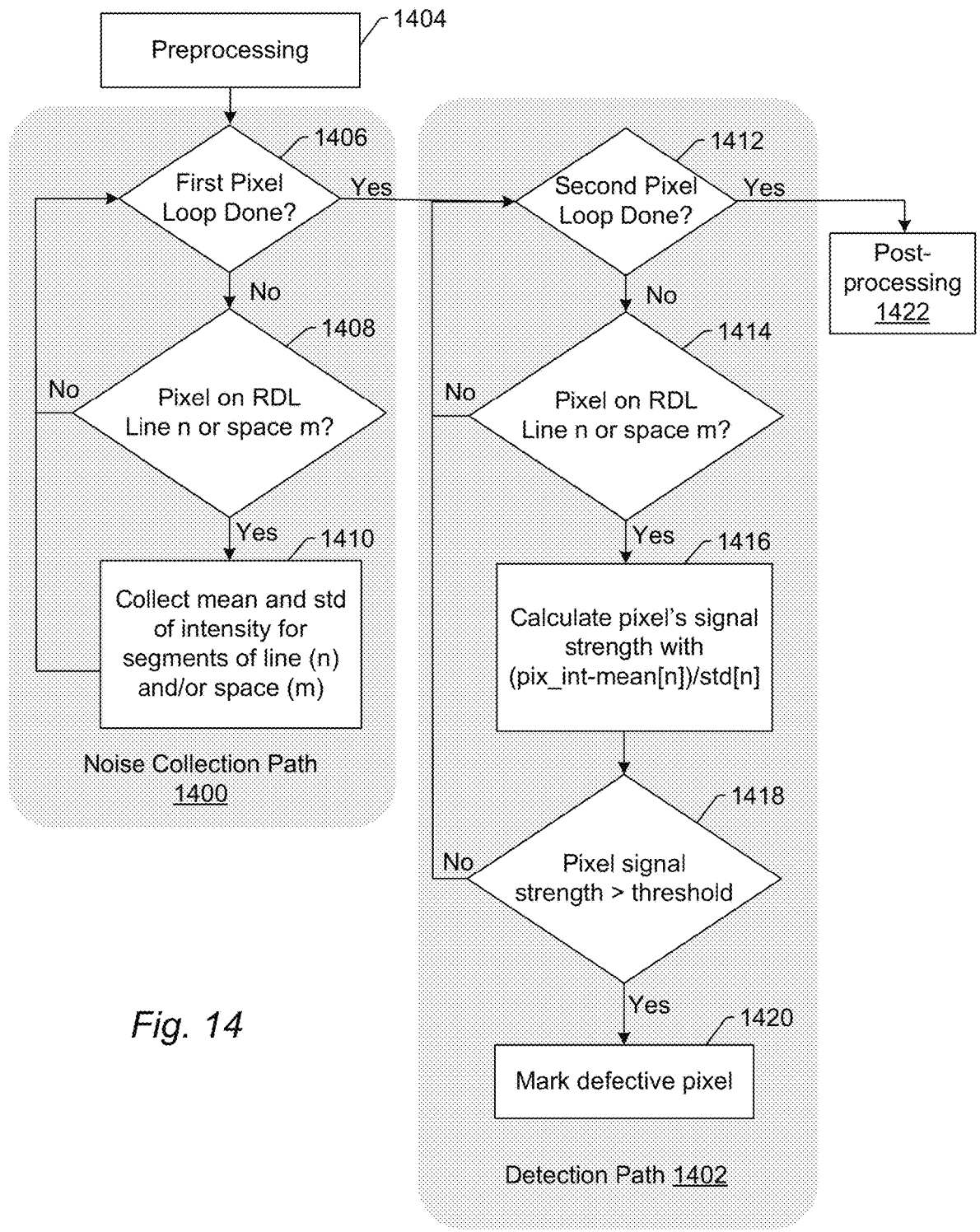

FIG. 14 illustrates an embodiment of steps that may be performed by the embodiments described herein for the "normalized relative strength to mean" based single die RDL line opening detection. As shown in FIG. 14, the steps may be performed in two phases, noise collection path phase 1400 and detection path phase 1402. Prior to beginning the noise collection path, the one or more computer subsystems perform preprocessing 1404, which may include any of the preprocessing steps described herein. After the preprocessing step(s) are completed, the one or more computer subsystems begin the noise collection path by determining if the first pixel loop is done, as shown in step 1406. If the first pixel loop is not done, the one or more computer subsystems determine if a pixel is on RDL line n or space m, as shown in step 1408. If the pixel is determined to not be on RDL line n or space m, the one or more computer subsystems return to step 1406. If the pixel is determined to be on RDL line n or space m, the one or more computer subsystems collect mean and standard deviation (std) of intensity for segments of line (n) and/or space (m), as shown in step 1410. After the one or more computer subsystems perform step 1410, the one or more computer subsystems return to step 1406.

When the one or more computer subsystems determine in step 1406 that the first pixel loop is done, the one or more computer subsystems begin detection path 1402 by determining if the second pixel loop is done in step 1412. If the one or more computer subsystems determine that the second pixel loop is not done, the one or more computer subsystems determine if a pixel is on RDL line n or space m, as shown in step 1414. If the pixel is determined to not be on RDL line n or space m, the one or more computer subsystems return to step 1412. If the pixel is determined to be on RDL line n or space m, the one or more computer subsystems calculate the pixel's signal strength with (pixel_intensity−mean[n])/std[n], as shown in step 1416. After the one or more computer subsystems calculate the pixel's signal strength, the one or more computer subsystems determine if the pixel's signal strength is greater than a threshold, as shown in step 1418. If the pixel's signal strength is not greater than the threshold, the one or more computer subsystems return to step 1412. If the pixel signal strength is greater than the threshold, then the computer subsystem(s) mark the pixel as defective, as shown in step 1420.

When the one or more computer subsystems determine that the second pixel loop is done in step 1412, the one or more computer subsystems begin post-processing phase 1422. The post-processing phase performed in this embodiment may be the same as the post-processing phase shown in FIG. 13.

The embodiments of the steps described above and shown in FIGS. 12-14 may be performed by any of the system embodiments described herein. In addition, the embodiments of the steps described and shown in these figures may be performed as described further herein and combined with any other steps described herein.

There are some differences and similarities between the first and second approaches described herein that may be used to select which of the approaches is best for any particular use case. For example, the first pixel range based approach needs only one detection pass of visiting each pixel in a frame, which makes it less costly in computation than the second approach, which may include two passes of frame pixel visiting, one for noise statistics collection (mean and standard deviation of intensity in each segment) and one for inspection. In addition, the first pixel range based approach detects complete line opening defects with relatively low cost while the second mean-based approach may detect RDL partial line opening defects in addition to complete line opening defects. To reduce the cost of the second mean-based approach, the embodiments can calculate mean and standard deviation on an MRD or another suitable reference in the setup phase as described herein. In this manner, the embodiments may avoid performing two passes for each pixel, but using such a reference may be less capable of accommodating wafer scale local process variations in different dies. The post-processing phase of both approaches may be identical. The post-processing step(s) in both approaches may include any of the post-processing step(s) described herein such as iDO based nuisance reduction and DL binning-based nuisance reduction.

The embodiments described herein have a number of advantages over other currently used systems and methods for detecting defects on RDL lines and other noisy patterned features. For example, the embodiments described herein may utilize the single die intensity-based feature for detecting (partial) line opening defects that overcomes the problems of excessive noise caused in die-to-die intensity differences by relatively rough metal surfaces of RDL lines. In addition, using the design-based mask allows the embodiments to work around the inconsistent shifts between RDL lines and the sub-die structures underneath the RDL lines. The embodiments described herein can also help to improve the sensitivity of capturing RDL line openings by existing backend inspection tools for aWLP use cases.

The embodiments described herein are different from currently used systems and methods for detecting defects on RDL lines and other noisy patterned features in a number of important ways that enable the advantages described above. For example, the embodiments described herein are capable of single die intensity-based inspection that avoids excessive noise in die-to-die difference based inspection. In addition, the embodiments described herein provide a new spatial continuity-based metric for RDL line opening detection. The embodiments described herein also provide a new relative strength-based metric for RDL line opening detection. Furthermore, the embodiments described herein may be configured to use design polygon information to simplify and facilitate the separation of different segments of RDL lines (e.g., horizontal, vertical, 135-degree diagonal, 45-degree diagonal) into different regions, which is particularly important for situations in which traditional intensity based mask generation becomes impossible. The embodiments described herein may also use DL based binning for better differentiation between the nuisance and DOI by removing the nuisance passed through from intensity-based detection approaches.

The one or more computer subsystems may be configured for generating results for the detected defect candidates and/or the detected defects. The results for the defect candidates and/or defects may include any of the results described herein such as information, e.g., location, etc., of the bounding boxes of the detected defects, detection scores, information about defect classifications such as class labels or IDs, etc., or any such suitable information known in the art. The results for the defect candidates and/or defects may be generated by the computer subsystem(s) in any suitable manner. The results for the defect candidates and/or defects may have any suitable form or format such as a standard file type. The computer subsystem(s) may generate the results and store the results such that the results can be used by the computer subsystem(s) and/or another system or method to perform one or more functions for the specimen or another specimen of the same type. Such functions include, but are not limited to, altering a process such as a fabrication process or step that was performed on the specimen in a feedback manner, altering a process such as a fabrication process or step that will be performed on the specimen in a feedforward manner, etc.

Each of the embodiments of each of the systems described above may be combined together into one single embodiment.

Another embodiment relates to a computer-implemented method for detecting defects on a specimen. The method includes identifying a patterned feature in a test image included in images generated of a specimen by an inspection subsystem. The method also includes, for at least one pixel in the test image located within the patterned feature, determining a difference between a characteristic of the at least one pixel and the characteristic of other pixels in the test image located within a predetermined window of the at least one pixel. In addition, the method includes detecting a defect candidate at the at least one pixel based on the determined difference. The identifying, determining, and detecting steps are performed by one or more computer subsystems coupled to the inspection subsystem.

Each of the steps of the method may be performed as described further herein. The method may also include any other step(s) that can be performed by the system, computer subsystem(s), and/or inspection subsystems described herein. The inspection subsystem and the one or more computer subsystems may be configured according to any of the embodiments described herein, e.g., inspection subsystem 10 and computer subsystem(s) 36 and 102, respectively. In addition, the method described above may be performed by any of the system embodiments described herein.

Figure 15:
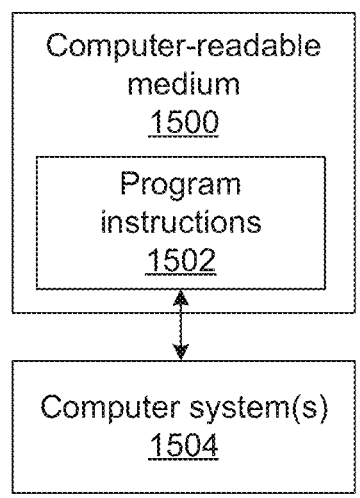
FIG. 15 is a block diagram illustrating one embodiment of a non-transitory computer-readable medium storing program instructions for causing one or more computer systems to perform a computer-implemented method described herein.

An additional embodiment relates to a non-transitory computer-readable medium storing program instructions executable on one or more computer systems for performing a computer-implemented method for detecting defects on a specimen. One such embodiment is shown in FIG. 15. In particular, as shown in FIG. 15, non-transitory computer-readable medium 1500 includes program instructions 1502 executable on computer system(s) 1504. The computer-implemented method may include any step(s) of any method(s) described herein.

Program instructions 1502 implementing methods such as those described herein may be stored on computer-readable medium 1500. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 1504 may be configured according to any of the embodiments described herein.

Further modifications and alternative embodiments of various aspects of the invention will be apparent to those skilled in the art in view of this description. For example, methods and systems for detecting defects on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to detect defects on a specimen, comprising:
   an inspection subsystem configured to generate images of a specimen; and
   one or more computer subsystems configured for detecting defect candidates on the specimen, wherein detecting the defect candidates comprises:
      identifying a patterned feature in a test image included in the images generated of the specimen;
      for at least one pixel in the test image located within the patterned feature, determining a difference between a characteristic of the at least one pixel and the characteristic of other pixels in the test image located within a predetermined window of the at least one pixel; and
      detecting a defect candidate at the at least one pixel based on the determined difference.

2. The system of claim 1, wherein the patterned feature comprises a line on a redistribution layer.

3. The system of claim 1, wherein the patterned feature is formed of metal.

4. The system of claim 1, wherein the determining and detecting steps are performed without a reference image.

5. The system of claim 1, wherein said identifying comprises applying a mask to the test image that separates pixels within the patterned feature in the test image from all other pixels in the test image.

6. The system of claim 5, wherein the one or more computer subsystems are further configured for generating the mask from a design for the specimen.

7. The system of claim 5, wherein the mask separates pixels within portions of the patterned feature having different orientations into different regions, and wherein the determining and detecting steps are performed separately for the different regions.

8. The system of claim 7, wherein the one or more computer subsystems are further configured for independently determining one or more characteristics of the predetermined window used for the determining step performed separately for the different regions.

9. The system of claim 1, wherein determining the difference comprises determining a range of the characteristic of the at least one pixel and the other pixels within the predetermined window, wherein the range is a difference between maximum and minimum values of the characteristic of the at least one pixel and the other pixels within the predetermined window, and wherein detecting the defect candidate comprises applying a threshold to the range.

10. The system of claim 9, wherein the defect candidate comprises a complete opening in the patterned feature.

11. The system of claim 9, wherein the one or more computer subsystems are further configured for determining if the defect candidate is a defect based on one or more characteristics of the defect candidate.

12. The system of claim 1, wherein determining the difference comprises determining a difference between the characteristic of the at least one pixel and a mean of the characteristic of the at least one pixel and the other pixels within the predetermined window.

13. The system of claim 12, wherein the predetermined window encompasses an entirety of the patterned feature in the test image.

14. The system of claim 12, wherein the predetermined window encompasses an entirety of the patterned feature in the test image and one or more other entire patterned features in the test image, and wherein the one or more other entire patterned features have a type and orientation that are the same as the patterned feature.

15. The system of claim 12, wherein detecting the defect candidate comprises determining a standard deviation from the mean and the characteristic of the at least one pixel and the other pixels within the predetermined window, determining a signal strength by dividing the difference by the standard deviation, and applying a threshold to the signal strength.

16. The system of claim 15, wherein the one or more computer subsystems are further configured for determining the mean and the standard deviation from a median reference image generated for the test image.

17. The system of claim 15, wherein the one or more computer subsystems are further configured for determining the mean and the standard deviation from the test image.

18. The system of claim 12, wherein said identifying comprises applying a mask to the test image that separates pixels within the patterned feature in the test image from all other pixels in the test image and pre-processing results of applying the mask to identify one or more pixels beyond one or more edges of the patterned feature and to remove the identified one or more pixels from the pixels within the patterned feature.

19. The system of claim 12, wherein said identifying comprises applying a mask to the test image that separates pixels within the patterned feature in the test image from all other pixels in the test image and post-processing results of applying the mask to identify one or more pixels beyond one or more edges of the patterned feature and to remove the identified one or more pixels from the pixels within the patterned feature.

20. The system of claim 12, wherein the defect candidate comprises a complete or partial opening in the patterned feature.

21. The system of claim 1, wherein the one or more computer subsystems are further configured for determining if the defect candidate is a defect by performing a morphological operation on results of the detecting.

22. The system of claim 1, wherein the one or more computer subsystems are further configured for determining if the defect candidate is a defect by binning the defect candidate based on the test image.

23. The system of claim 1, wherein the one or more computer subsystems are further configured for determining if the defect candidate is a defect by applying a deep learning based classifier to the test image.

24. The system of claim 1, wherein the inspection subsystem is further configured for macro inspection.

25. The system of claim 1, wherein the inspection subsystem is further configured as an electron beam subsystem.

26. The system of claim 1, wherein the inspection subsystem is further configured as an optical subsystem.

27. The system of claim 1, wherein the specimen is a wafer.

28. A non-transitory computer-readable medium, storing program instructions executable on one or more computer systems for performing a computer-implemented method for detecting defects on a specimen, wherein the computer-implemented method comprises:

identifying a patterned feature in a test image included in images generated of a specimen by an inspection subsystem;

for at least one pixel in the test image located within the patterned feature, determining a difference between a characteristic of the at least one pixel and the characteristic of other pixels in the test image located within a predetermined window of the at least one pixel; and detecting a defect candidate at the at least one pixel based on the determined difference.

29. A computer-implemented method for detecting defects on a specimen, comprising:

identifying a patterned feature in a test image included in images generated of a specimen by an inspection subsystem;

for at least one pixel in the test image located within the patterned feature, determining a difference between a characteristic of the at least one pixel and the characteristic of other pixels in the test image located within a predetermined window of the at least one pixel; and detecting a defect candidate at the at least one pixel based on the determined difference, wherein said identifying, determining, and detecting are performed by one or more computer subsystems coupled to the inspection subsystem.

* * * * *